Aug. 30, 1938.  R. ANXIONNAZ  2,128,789

AIRCRAFT MACHINERY

Filed Feb. 8, 1936

Patented Aug. 30, 1938

2,128,789

UNITED STATES PATENT OFFICE 2,128,789

AIRCRAFT MACHINERY

René Anxionnaz, Paris, France

Application February 8, 1936, Serial No. 63,000
In France February 16, 1935

4 Claims. (Cl. 244—59)

The present invention relates to a turbo-compressor for aircraft engines, the exhaust gases of which are utilized, in the turbine, in order to increase the engine output, and especially to re-establish the normal output when the engine is run at high altitudes.

Hitherto this has been done chiefly in connection with water-cooled aircraft engines, and the position of the turbo-compressor or compressors has been determined solely by the space available for mounting, or by considerations of general efficiency.

The object of the present invention is to adapt a turbo-compressor to an air-cooled radial engine, under satisfactory conditions, and to this end the turbo-compressor is located in rear of the cylinders and the axis of the turbine is at right angles to the axis of the radial engine, so that the head resistance due to the presence of the turbine is reduced to the minimum, efficient cooling of the engine cylinders by the air is maintained, and powerful cooling of the hot member of the turbo-compressor—that is to say, the turbine—is ensured.

Figure 1:
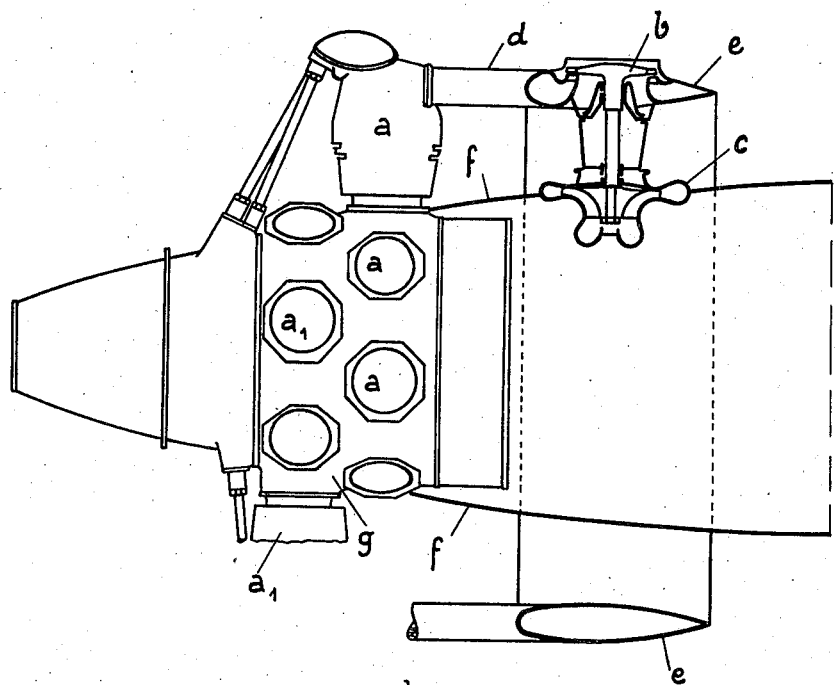
Figure 2:
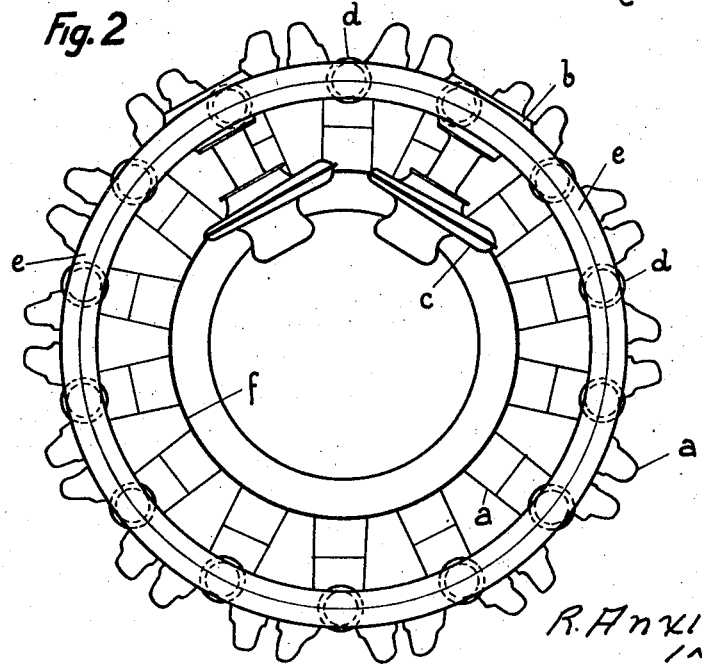

In the accompanying diagrammatic drawing which illustrates, by way of example, an embodiment of the arrangement; Figure 1 represents a side elevation of the engine and turbo-compressor, in partial section, and Figure 2 is a rear view, from right to left of the arrangement shown in Figure 1.

In this example, a radial engine with two rows of cylinders $a$ $a_1$ has been selected. One of the cylinders, $a$ or $a_1$ of each row, is shown in side elevation ($a_1$ being partly broken away), the other cylinders being indicated by their position in the housing $g$. These cylinders are connected, by means of exhaust pipes $d$, with two turbo-compressors, each comprising an exhaust-gas turbine $b$ and a compressor $c$. The exhaust manifold is in the form of a ring $e$ constituting a silencer and is streamlined to offer the minimum resistance to the air. The turbine $b$ is located within said ring $e$ and behind the cylinders $a$, $a_1$, its axis being at right angles to the axis of the radial engine. The compressor $c$ is situated inside the casing $f$, extending from the housing $g$, the whole being also streamlined.

The turbine $b$, being located behind the cylinder $a$, does not increase appreciably the head resistance, which is also reduced by the streamlining of the turbine and casing, whilst the presence of the turbo-compressor does not impair appreciably the cooling of any of the engine cylinders. The location of turbine $b$ in the air stream that has flown past the engine cylinders ensures its energetic cooling—a useful feature in view of the high temperature of the exhaust gases fed to said turbine. In passing over the engine, the air is heated only to such a slight extent that it is still capable of efficient action on the turbine $b$.

The arrangement may also be carried out with different engines and a different number of turbo-compressors.

What I claim is:

1. In an aircraft, the combination of a fuselage, an air-cooled engine carried by said fuselage having at least one row of cylinders projecting radially from said fuselage so as to be cooled by the relative wind produced along said fuselage by the movement of said aircraft, and a turbo-compressor carried by said fuselage behind said row of cylinders, said turbo-compressor including a turbine having its axis at right angles to the engine axis and a compressor coupled directly with said turbine coaxially therewith, said turbine being located substantially in a cylindrical surface coaxial with said engine and passing through the outer ends of said cylinders, and said compressor being located between said turbine and the axis of said row of cylinders.

2. In an aircraft, the combination of a fuselage, an air-cooled engine carried by said fuselage having at least one circular row of cylinders projecting radially from said fuselage so as to be cooled by the relative wind produced along said fuselage by the movement of said aircraft, and a turbo-compressor carried by said fuselage behind said row of cylinders, said turbo-compressor including a turbine having its axis at right angles to the engine axis and a compressor coupled directly with said turbine coaxially therewith, said turbine being located substantially in a cylindrical surface coaxial with said engine and passing through the outer ends of said cylinders, and said compressor being located at least partly in said fuselage.

3. In an aircraft, the combination of a fuselage, an air-cooled engine carried by said fuselage having at least one circular row of cylinders projecting radially from said fuselage so as to be cooled by the relative wind produced along said fuselage by the movement of said aircraft, a turbo-compressor carried by said fuselage behind said row of cylinders, said turbo-compressor including a turbine having its axis at right angles to the engine axis and a compressor coupled directly with said turbine coaxially therewith, said turbine being located substantially in a cylindrical surface coaxial with said engine and passing through the outer ends of said cylinders, and said compressor being located at least partly in said fuselage, and an annular manifold for said engine coaxial therewith so as to surround said fuselage at a distance therefrom, arranged to form a casing for said turbine, said manifold being of streamlined axial section.

4. In an air craft, the combination of a streamlined aircraft element, an air-cooled engine carried by said aircraft element having at least one row of cylinders projecting radially from said aircraft element so as to be cooled by the relative wind produced along said aircraft element by the movement of said aircraft, and a turbo-compressor carried by said aircraft element behind said row of cylinders, said turbo-compressor including a turbine having its axis at right angles to the engine axis and a compressor coupled directly with said turbine coaxially therewith, said turbine being located substantially in a cylindrical surface coaxial with said engine and passing through the outer ends of said cylinders, and said compressor being located between said turbine and the axis of said row of cylinders.

RENÉ ANXIONNAZ.